US008799884B2

(12) United States Patent
Dreyer et al.

(10) Patent No.: US 8,799,884 B2
(45) Date of Patent: Aug. 5, 2014

(54) SOFTWARE APPLICATION PERFORMANCE ENHANCEMENT

(75) Inventors: Robert Scott Dreyer, Menlo Park, CA (US); Joel Kevin Jones, Alameda, CA (US); Michael Douglas Sharp, Los Gatos, CA (US); Ivan Dimitrov Baev, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 855 days.

(21) Appl. No.: 12/583,188

(22) Filed: Aug. 13, 2009

(65) Prior Publication Data

US 2010/0042981 A1 Feb. 18, 2010

Related U.S. Application Data

(60) Provisional application No. 61/188,905, filed on Aug. 13, 2008.

(51) Int. Cl.
*G06F 9/45* (2006.01)
*G06F 9/30* (2006.01)

(52) U.S. Cl.
CPC . *G06F 8/456* (2013.01); *G06F 8/52* (2013.01)
USPC ............................. 717/158; 717/152; 712/203

(58) Field of Classification Search
USPC .................................. 717/152, 158; 712/203
See application file for complete search history.

(56) References Cited

U.S. PATENT DOCUMENTS

| | | | | |
|---|---|---|---|---|
| 5,937,192 A | * | 8/1999 | Martin | 717/145 |
| 5,966,537 A | * | 10/1999 | Ravichandran | 717/158 |
| 8,037,465 B2 | * | 10/2011 | Tian et al. | 717/158 |
| 8,127,121 B2 | * | 2/2012 | Yates et al. | 712/244 |
| 8,271,943 B2 | * | 9/2012 | Hudson, III | 717/113 |
| 2003/0110481 A1 | * | 6/2003 | Wada et al. | 717/158 |
| 2003/0236951 A1 | * | 12/2003 | Choi et al. | 711/150 |
| 2004/0010782 A1 | * | 1/2004 | Moritz | 717/151 |
| 2005/0086650 A1 | | 4/2005 | Yates et al. | |
| 2006/0037009 A1 | * | 2/2006 | Linden | 717/145 |
| 2008/0005547 A1 | * | 1/2008 | Papakipos et al. | 712/244 |

FOREIGN PATENT DOCUMENTS

| | | |
|---|---|---|
| JP | 2001075802 A | 3/2001 |
| WO | WO-2006111705 A2 | 10/2006 |

OTHER PUBLICATIONS

Karkowski et al., "Overcoming the limitations of the traditional loop parallelization"; 1998, Elsevier, 10pg.*
Mei et al., "Exploiting loop-level parallelism on coarse-grained reconfigurable architectures using modulo scheduling"; IEEE, 2003, 7pg.*

(Continued)

*Primary Examiner* — Ryan Coyer
(74) *Attorney, Agent, or Firm* — Nicholas A. Cole (57) ABSTRACT

Generating parallelized executable code from input code includes statically analyzing the input code to determine aspects of data flow and control flow of the input code; dynamically analyzing the input code to determine additional aspects of data flow and control flow of the input code; generating an intermediate representation of the input code based at least in part on the aspects of data flow and control flow of the input code identified by the static analysis and the additional aspects of data and control flow of the input code identified by the dynamic analysis; and processing the intermediate representation to determine portions of the intermediate representation that are eligible for parallel execution; and generating parallelized executable code from the processed intermediate representation.

23 Claims, 10 Drawing Sheets

(56) References Cited

OTHER PUBLICATIONS

Isard et al., "Dryad: Distributed Data-Parallel Programs from Sequential Building Blocks," ACM, 2007, 14pg.*
IBM et al., "A Method and System to Improve the Performance of Instrumentation to Multi-threaded Program," IBM Technical Disclosure Bulletin, Mar. 17, 2008, 4pg.*
Dehnert et al., "The Transmeta Code Morphing Software: Using Speculation, Recover, and Adaptive Retranslations to Address Real-Life Challenges", Proceedings of the First Annual IEEE/ACM International Symposium of Code Generation and Optimization, Mar. 27, 2003.
Chernoff et al., "Digital FX!32 Running 32-Bit x86 Applications on alpha NT", Proceedings of the USENIX Windows NT Workshop, Aug. 11, 1997.
Wang et al., "Dynamic Parallelization of Single-Threaded Binary Programs using Speculative Slicing", Proceedings of the 23rd International Conference on Supercomputing, Jun. 8, 2009.
Ebcioglu et al., "DAISY: Dynamic Complication for 100% Architectural Compatibility", Proceedings of the 24th Annual International Symposium on Computer Architechture, Jun. 2, 1997.
Chen et al., "Data Dependence Profiling for Speculative Optimizations", Proceedings of the 13th International Conference on Compiler Construction, Mar. 29, 2004.
Yardimci et al., "Dynamic Parallelization and Mapping of Binary Executables on Hierarchical Platforms", Proceedings of the ACM International Conference on Computing Frontiers, May 3, 2006.
Lu et al., "Design and Implementation of a Lightweight Dynamic Optimization System", Journal of Instruction-Level Parallelism, vol. 6, Apr. 2004.
Cohn et al., "Spike: An Optimizer for Alpha/NT Executables", Proceedings of the USENIX Windows NT Workshop, Aug. 11, 1997.
Colohan et al., "Tolerating Dependences Between Large Speculative Threads via Sub-Threads", ISCA, Jun. 2006.
Steffan et al., "The STAMPede approach to thread-level speculation", ACM Transactions on Computer Systems (TOCS), Aug. 2005.
Bruening et al., "Softspec: Software-based Speculative Parallelism", LCS Computer Architecture Publication, Apr. 17, 2000.
Raman et al., "Parallel-Stage Decoupled Software Pipelining", Proceedings of the 2008 International Symposium on Code Generation and Optimization (CGO), Apr. 2008.
Raman et al., "SPICE: Speculative Parallel Iteration Chunk Execution", Proceedings of the 2008 International Symposium on Code Generation and Optimization (CGO), Apr. 2008.
Bridges et al., "Revisiting the Sequential Programming Model for the Multicore ERA", IEEE Micro, Jan. 2008.
Ottoni et al., "Global Multi-Threaded Instruction Scheduling", Proceedings of the 40th IEEE/ACM International Symposium on Microarchitecture (MICRO), Dec. 2007.
Ottoni et al.,"Automatic Thread Extraction with Decoupled Software Pipelining", Micro38, 2005.
Zhong et al., "Uncovering Hidden Loop Level Parallelism in Sequential Applications", HPCA 2008.
Nethercote et al., "Valgrind: A Framework for Heavyweight Dynamic Binary Instrumentation", Proceedings of the 2007 PLDI conference, Jun. 2007, pp. 89-100.
Yourst et al., "PTLsim: A Cycle Accurate Full System x86-64 Microarchitectural Simulator", IEEE International Symposium on Performance Analysis of Systems & Software, 2007.
Fabrice Bellard, "QEMU, a Fast and Portable Dynamic Translator", Proceedings of the annual conference on USENIX Annual Technical Conference, 2005.
Pickett er al., "Speculative Multithreading in a Java Virtual Machine", Sable Technical Report No. 2005-1, Mar. 25, 2005.
Zhang et al., "An Event-Driven Multithreaded Dynamic Optimization Framework", PACT: Proceedings of the 14th International Conference on Parallel Architectures and Compilation Techniques; Sep. 17-21, 2005.

Lau et al., "Online Performance Auditing: Using Hot Optimizations Without Getting Burned", Proceedings of the 2006 ACM SIGPLAN conference on Programming language design and implementation, 2006.
Liao et al., "Post-Pass Binary Adaptation for Software-Based Speculative Precomputation", 2002 ACM SIGPLAN Conference on Programming Language Design and Implementation, 2002.
Pan et al., "Controlling Program Execution through Binary Instrumentation", ACM SIGARCH Computer Architecture News, Dec. 2005.
Bala et al., "Dynamo: A Transparent Dynamic Optimization System", ACM SIGPLAN Notices, May 2000.
Daniel Williams, "Threaded Software Dynamic Translation", Master's Project, University of Virginia, Aug. 30, 2005.
Sridhar et al., "HDTrans: An Open Source, Low-Level Dynamic Instrumentation System", Proceedings of the 2nd international conference on Virtual execution environments, 2006.
Sullivan et al., "Dynamic Native Optimization of Interpreters", Proceedings of the 2003 workshop on Interpreters, virtual machines and emulators, 2003.
Saha et al., "McRT-STM: A High Performance Software Transactional Memory System for a Multi-Core Runtime", Proceedings of the eleventh ACM Sigplan symposium on Principles and practice of parallel programming, 2006.
Rundberg et al., "An All-Software Thread-Level Data Dependence Speculation System for Multiprocessors", Journal of Instruction-Level Parallelism, 2002.
Hall et al., Detecting Coarse-Grain Parallelism Using an Interprocedural Parallelizing Compiler, Proceedings of the IEEE/ACM SC95 Conference, 1995.
Chung et al., "Thread-Safe Dynamic Binary Translation using Transactional Memory", IEEE 14th International Symposium on High Performance Computer Architecture, 2008.
Olszewski et al., "JudoSTM: A Dynamic Binary-Rewriting Approach to Software Transactional Memory", Proceedings of the 16th International Conference on Parallel Architecture and Compilation Techniques, 2007.
Bruening et al., "An Infrastructure for Adaptive Dynamic Optimization", Proceedings of the international symposium on Code generation and optimization: feedback-directed and runtime optimization, 2003.
Li et al., "Speculative Parallel Threading Architecture and Compilation", Proceedings of the 2005 International Conference on Parallel Processing Workshops, 2005.
Du et al., "A cost-driven compilation framework for speculative parallelization of sequential programs", ACM SIGPLAN Notices, May 2004.
Johnson et al., "Speculative Thread Decomposition Through Empirical Optimization", Proceedings of the 12th ACM SIGPLAN symposium on Principles and practice of parallel programming, 2007.
Pickett et al., "Software Thread Level Speculation for the Java Language and Virtual Machine Environment", Languages and Compilers for Parallel Computing, 2006, pp. 304-318.
Shavit et al., "Software Transactional Memory", Distributed Computing, Feb. 1997, pp. 99-116.
Steffan et al., "The Potential for Using Thread-Level Data Speculation to Facilitate Automatic Parallelization", HPCA-4, Feb. 1-4, 1998.
Oplinger et al., "In Search of Speculative Thread-Level Parallelism", Proceedings of the 1999 International Conference on Parallel Architectures and Compilation Techniques, 1999.
International Search Report and Written Opinion—PCT/US2009/004649—ISA/EPO—Sep. 21, 2009.
Lieberman, S.A., et al., "Extracting Statistical Loop-Level Parallelism using Hardware-Assisted Recovery", Technical Report of the Computer Science and Engineering Department No. CSE-TR-528-07, Feb. 1, 2007, pp. 1-12, XP055010880, Retrieved from the Internet: URL:http://www.eecs.umich.edu/techreports/cse/2007/CSETR-528-07.pdf [retrieved on Oct. 31, 2011].
Rus, et al., "Compiler Technology for Migrating Sequential Code to Multi-threaded Architectures", Technical Report TR06-006, Parasol Lab, pp. 1-20, Apr. 28, 2006.

(56) References Cited

OTHER PUBLICATIONS

Supplementary European Search Report—EP09806977—Search Authority—Munich—Jan. 24, 2013.

Wang, C., et al., "Supporting Legacy Binary Code in a Software Transaction Compiler with Dynamic Binary Translation and Optimization", Mar. 26, 2007, 17th International Conference on Compiler Construction (CC 2008), Budapest, Hungary, Mar. 29-Apr. 6, 2008; [Lecture Notes in Computer Science; 4959], Springer Berlin Heidelberg, Berlin, Heidelberg, XP019087968, ISBN: 978-3-5407-8790-7, pp. 291-306.

Yardimci, E., et al., "Dynamic Parallelization and Vectorization of Binary Executables on Hierarchical Platforms", Journal of Instruction-Level Parallelism, Jun. 1, 2008, pp. 1-24, XP055049506, Retrieved from the Internet: URL:http://www.jilp.org/vol10/v10paper6.pdf [retrieved on Jan. 14, 2013].

Yamaguchi Y., et al., "Speculative Control/Data Dependence Graph and Java Jog-time Analyzer", IPSJ Journal, Japan, Information Processing Society of Japan, Feb. 15, 1999, vol. 40, No. SIGI (PRO 2), pp. 32-34.

* cited by examiner

CFG for 'fib' function

FIG. 10

SOFTWARE APPLICATION PERFORMANCE ENHANCEMENT

CROSS REFERENCE TO OTHER APPLICATIONS

This application claims priority to U.S. Provisional Patent Application No. 61/188,905 entitled METHOD AND APPARATUS TO ENHANCE THE PERFORMANCE OF SOFTWARE APPLICATIONS filed Aug. 13, 2008 which is incorporated herein by reference for all purposes.

BACKGROUND OF THE INVENTION

In computer systems, improvements in the performance and efficiency of software enable new and improved applications and functionality. This synergistic interaction between more powerful software that requires more powerful hardware which in turn enables more powerful software has been the driver of the information revolution of the past several decades. In the history of "instruction set compatible" computing, newer generations of computer hardware have provided substantial improvements to existing applications while new and re-compiled applications provided additional improvements beyond the hardware ones.

As computer hardware architecture technology has matured, however, it has become increasingly difficult for microprocessor vendors to deliver increased performance through micro-architecture techniques. Because technology is reaching the limits of cost-effective techniques to improve the instruction-level parallelism within threads of computation, many in the industry view thread-level parallelism as the best technology with which to continue the performance treadmill. Accordingly, manufacturers have begun to produce "multi-core" CPUs that include multiple processors within a single semiconductor "chip." In concert with this, the leading SW developers have begun to call for applications to be re-written to take advantage of the performance potential of multi-core processors.

As a consequence of these developments, existing applications often can no longer expect substantial improvements in performance with new generations of computer hardware. Large performance improvements are typically only available to re-written applications that are specifically targeted for newer multi-core processors. Moreover, the process of programming a multi-threaded application to take advantage of a multi-processor architecture is often complex and error-prone.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique for generating parallelized executable code from input code is disclosed. The input code is statically analyzed to determine aspects of data flow and control flow of the input code. In some embodiments, the input code is also dynamically analyzed to determine additional aspects of data flow and control flow. An Intermediate Representation (IR) is generated based at least in part on the determined aspects. The IR is processed, and portions of the IR that are eligible for parallel execution are identified. In some embodiments, parallelized code configured to execute the identified portions in parallel is generated and saved in a cache so that a later invocation of the original input code invokes the cached code instead.

Figure 1:
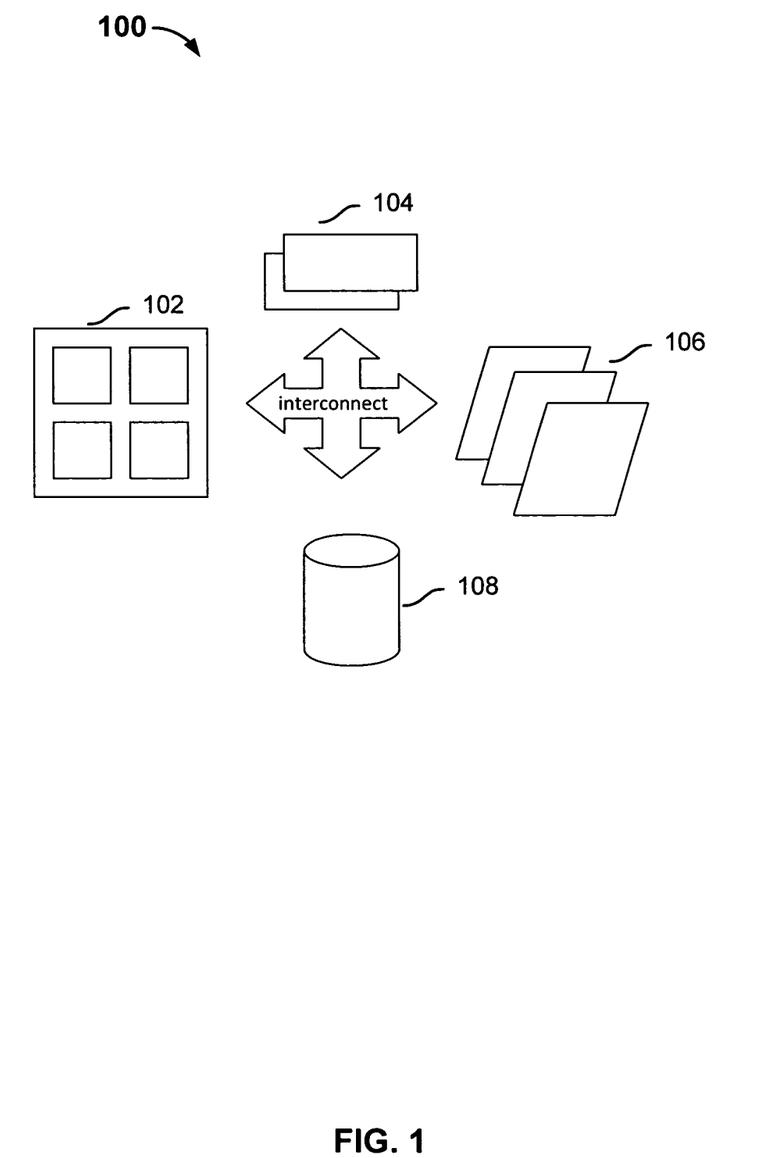
FIG. 1 is a block diagram illustrating an embodiment of a multi-processor hardware system.

FIG. 1 is a block diagram illustrating an embodiment of a multi-processor hardware system. Example system 100 includes one or more multi-core central processing units (CPU) 102, one or more dynamic memories 104, one or more input/output (I/O) devices 106 such as networking cards, display, keyboard, etc., and one or more non-volatile storages 108 such as disk storage or flash memory. The components are interconnected to each other.

Figure 2:
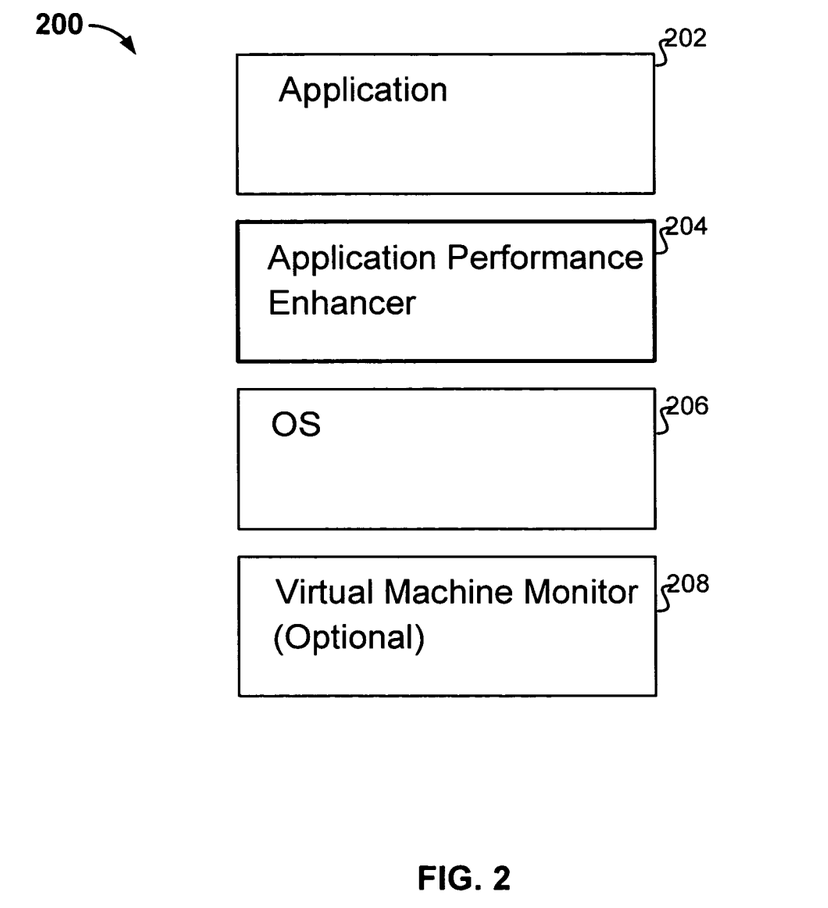
FIG. 2 is a block diagram illustrating an embodiment of a software system with enhanced application performance.

FIG. 2 is a block diagram illustrating an embodiment of a software system with enhanced application performance. In this example, application performance enhancer 204 (also referred to as the accelerator) is configured to process the executables of applications such as 202 and enhance the performance of the applications. As will be described in greater detail below, the application performance enhancer transforms an executable into an intermediate representation and identifies portions in the intermediate representation that can be executed in parallel using static and dynamic analysis.

Figure 3A:
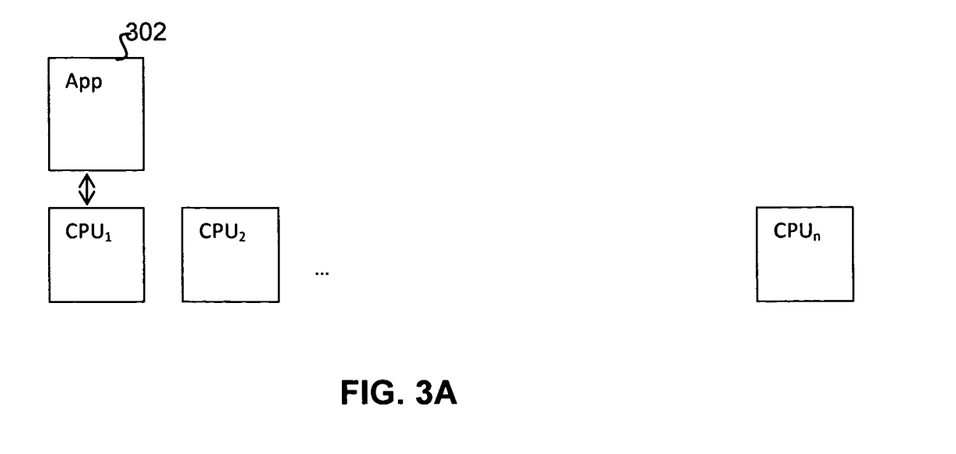
FIG. 3A is a diagram illustrating the mapping of an application to CPUs in a multi-processor hardware system without performance enhancement.

FIG. 3A is a diagram illustrating the mapping of an application to CPUs in a multi-processor hardware system without performance enhancement. In this example, an application such as 302 has a single thread and runs on a single CPU while the other CPU cores are idle. Even if the application is multi-threaded, the threading is typically done in a manner that is the simplest for the programmer rather than in a manner that yields the best performance. In other words, the application is often partitioned for the ease of programming rather than balanced across multiple treads for the best performance. For example, applications that employ the Windows™ Graphical User Interface (GUI) are often partitioned into a thread for the main application and a separate thread for the management of the GUI. This form of multi-threading, however, does not optimize the performance of main processing threads. Furthermore, in a modern time-sliced, multi-tasking, multi-processor environment, multiple applications can be running simultaneously, each on separate cores. The relationship between each of those applications and a corresponding executing CPU is typically the one-to-one relationship shown in FIG. 3A, which usually does not lead to the best utilization of the processing power of multiple CPUs.

Figure 3B:
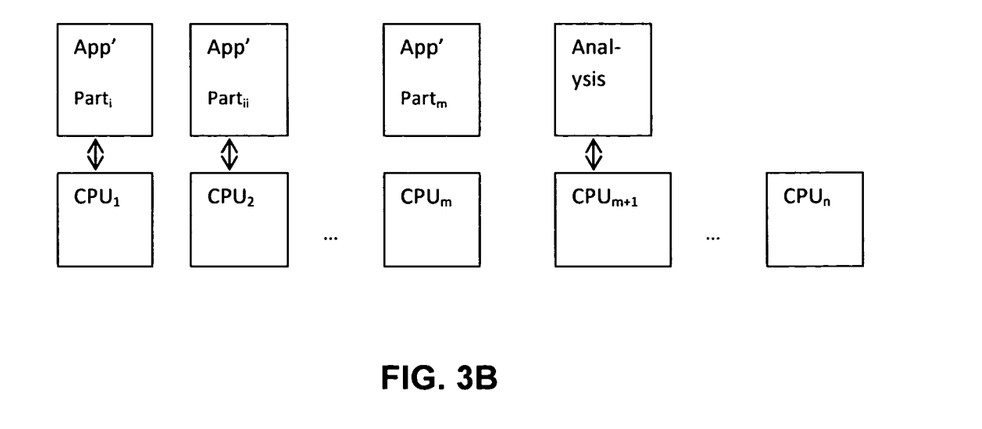
FIG. 3B is a diagram illustrating the mapping of an application to CPUs in an embodiment of a multi-processor hardware system with performance enhancement.

FIG. 3B is a diagram illustrating the mapping of an application to CPUs in an embodiment of a multi-processor hardware system with performance enhancement. The main thread(s) of an application is analyzed for parallel computation. Portions that are deemed eligible for parallel computation, such as parts i, ii, . . . , m, are reconfigured to run in multiple threads on separate CPUs, thus achieving a high degree of parallelization and improved performance.

Figure 4:
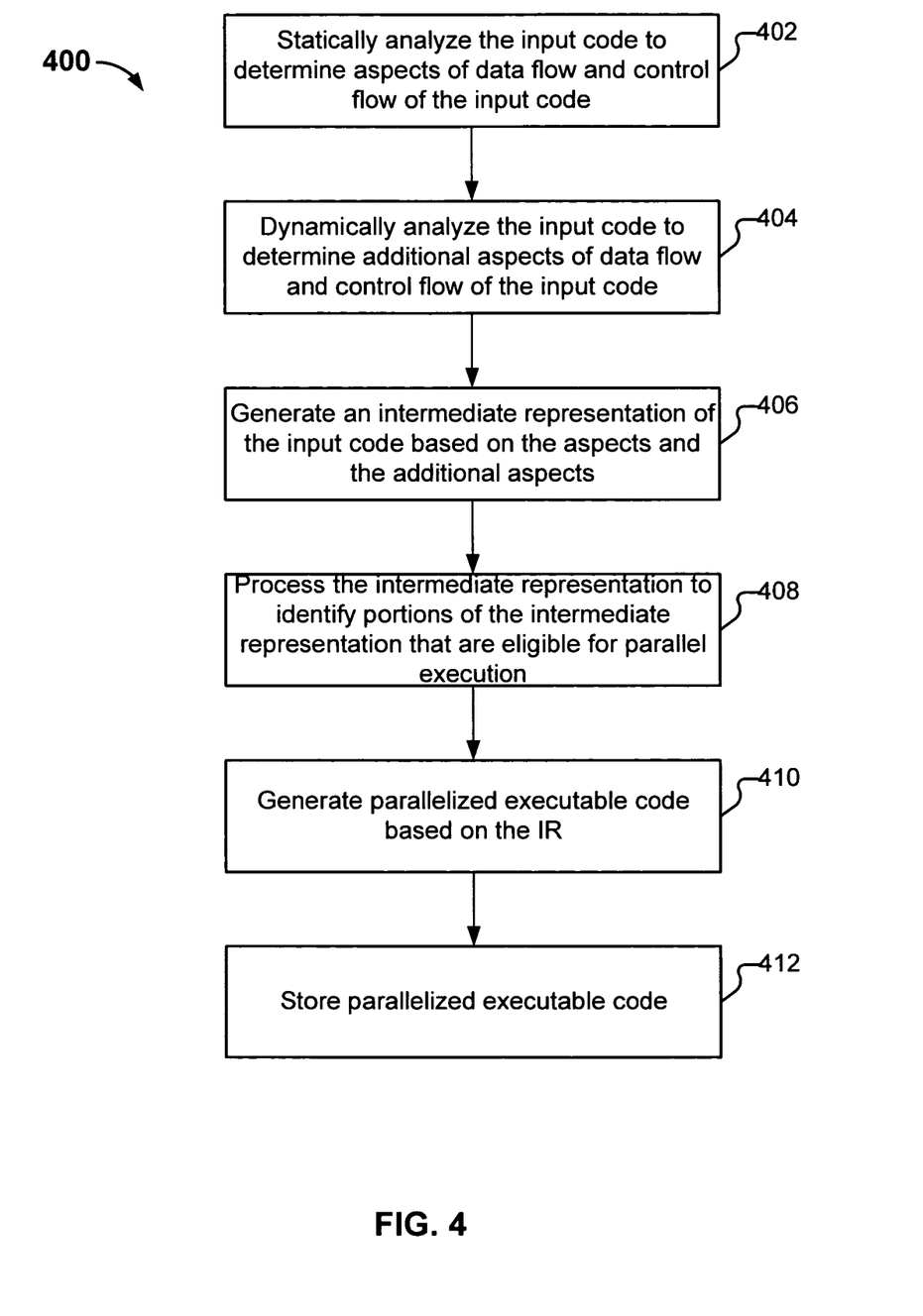
FIG. 4 is a flowchart illustrating an embodiment of a process for generating parallel executable code from input code.

FIG. 4 is a flowchart illustrating an embodiment of a process for generating parallel executable code from input code. In various embodiments, process 400 may take place on the end user's computer, or at software development time on the developer's system. In various embodiments, source, assembly, and/or binary code can be used as input code. At 402, the input code is statically analyzed. As used herein, the static analysis refers to analysis of the code where the code is not required to be executing during the analysis. Static analysis may take place offline, at a time when the demand on system resources is low. In some embodiments, the static analysis disassembles the input code, and identifies the data portion and the code portion of the input code, including the instructions, the operations, and aspects of the data flow and the control flow. Some of the information that is identified includes the data contained in data segments, the code contained in code segments, header information that helps with the processing of the data above.

Certain aspects of the data flow and the control flow, such as information dependent on the behavior of the code, can be difficult to obtain using static analysis. Thus, at 404, the input code is dynamically analyzed to identify additional aspects of the data flow and control flow. As used herein, dynamic analysis refers to online or runtime analysis that takes place while the code is executing. In various embodiments, execution frequency, hotspots and other profile information, branch target, memory alias information, and dynamic loop count, etc. are some of the aspects identified via dynamic analysis. The information may be collected via interpretation or emulation of the code at runtime, and/or by executing instrumented code.

At 406, an Intermediate Representation (IR) of the input code is generated based on the aspects identified by the static analysis and the additional aspects identified by the dynamic process. At 408, the IR is further processed to identify portions that are eligible for parallel execution, and the intermediate representation is manipulated to form a modified IR that includes the parallelized portions. A variety of parallelization techniques may be used. For example, loops may be unrolled using techniques such as software piplining, dynamic checks may be inserted to convert data dependencies into control dependencies. The IR is sent to a code generator, which generates parallelized executable code based on the IR, at 410. The parallelized executable code is stored, at 412.

Figure 5:
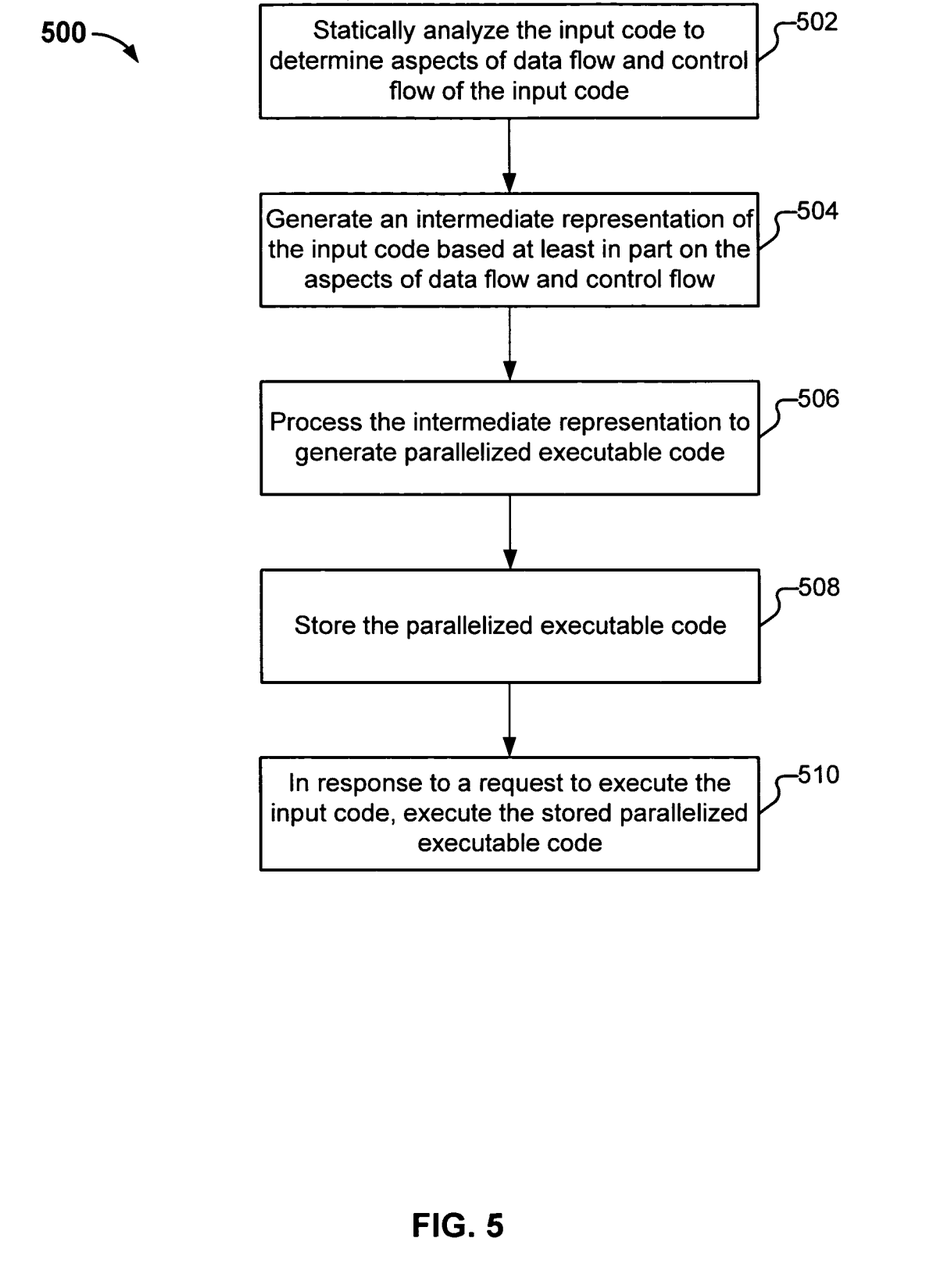
FIG. 5 is a flowchart illustrating another embodiment of a process for generating parallel executable code from input code.

FIG. 5 is a flowchart illustrating another embodiment of a process for generating parallel executable code from input code. In various embodiments, process 500 may take place on the end user's computer, or at software development time on the developer's system. At 502, the input code is statically analyzed to identify aspects of data flow and control flow of the input code. In some embodiments, dynamic analysis is optionally performed to determine additional aspects of data flow and control flow of the input code. In some embodiments, dynamic analysis is omitted. At 504, an intermediate representation of the input code is generated based at least in part on the aspects of data flow and control flow determined by the static analysis. If dynamic analysis has been performed, the IR would also be based at least in part on the additional aspects as well. At 506, the IR is processed. Parallelizable portions in the IR are identified, and parallelized executable code is generated. At 508, the parallelized executable code is stored, so that it can be re-used later. Mapping of the parallelized executable code and the original input code is maintained. At 510, in response to a request to execute the input code, the stored parallelized executable code is loaded into memory and executed instead of the original code. As will be described more fully below, a variety of caching techniques may be used to store the executable in different embodiments.

Figure 6:
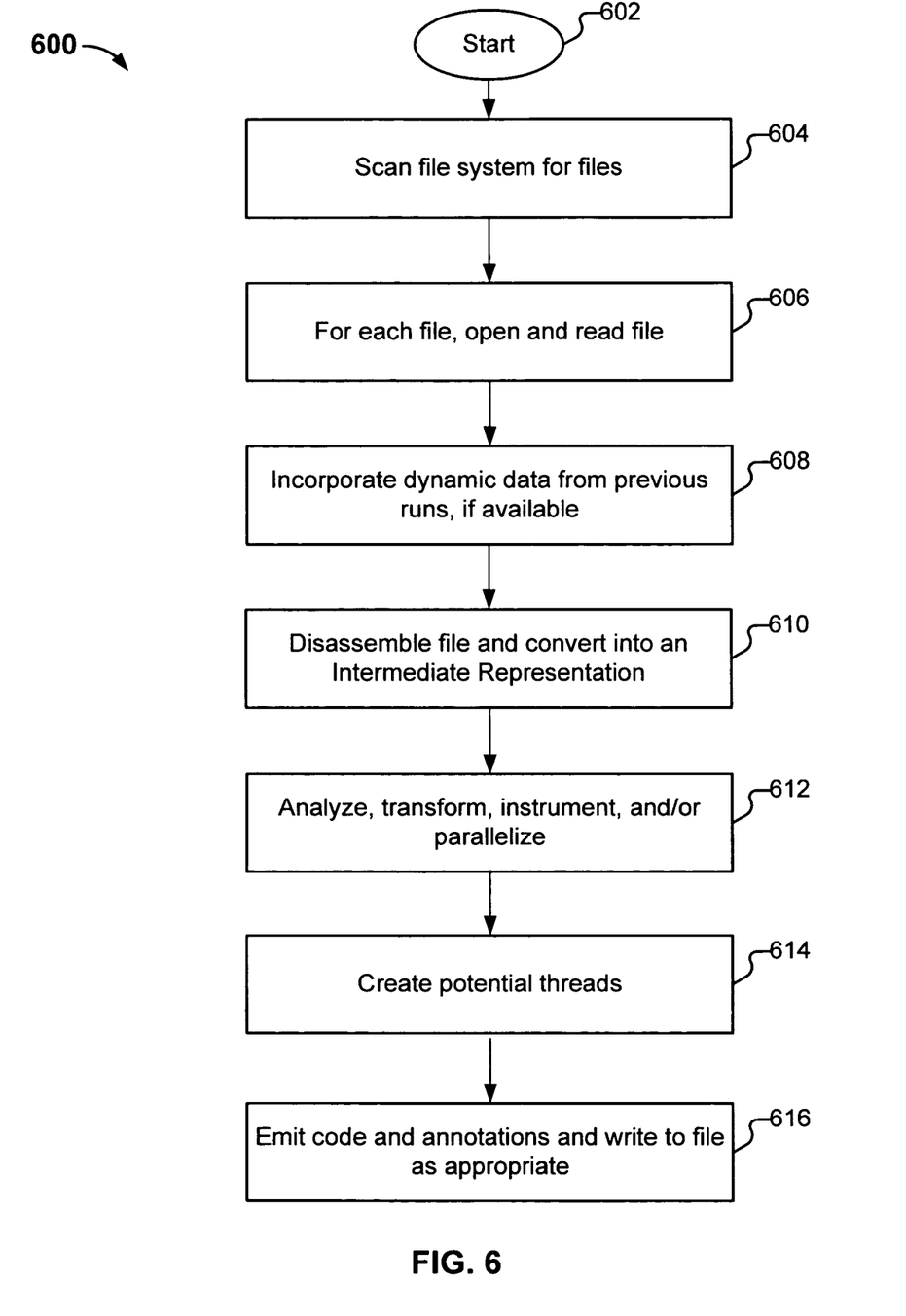
FIG. 6 is a flowchart illustrating an embodiment of a static analysis process.

FIG. 6 is a flowchart illustrating an embodiment of a static analysis process. The process starts at 602, at boot time, in response to a user request, in response to a programmatic invocation, or the like. At 604, the file system is scanned for executables, any referenced dynamically linked libraries (DLLs), and/or shared object (SO) files. Optionally, frequently/recently used and/or updated applications and libraries are identified. For each file, at 606, the file is opened and read. At 608, dynamic data such as runtime statistics from prior runs is analyzed if available. At 610, the file is disassembled and converted into a statically generated intermediate representation. At 612, transformation is performed on the IR. In some embodiments, the transformation involves analyzing the code and identifying portions in the IR that can be run in parallel. In some embodiments, the transformation involves adding instrumenting code that will facilitate the instrumentation of runtime information, such as analysis of hotspots and other profile information, branch target information, memory alias information, and dynamic loop count information, etc. In some embodiments, the transformation involves modifying the code.

At 614, potential threads are created, including checker code and other instrumentation such as links back to runtime for items that require runtime assistance, such as for error recovery. At 616, code and annotations are emitted. If the application has not yet been parallelized, the code and annotations are stored. DLLs or other library code may be parallelized in different ways depending on the invoking code. In some embodiments, multiple parallelizations for these DLLs are generated, and each copy is associated with the calling application/function.

Figure 7:
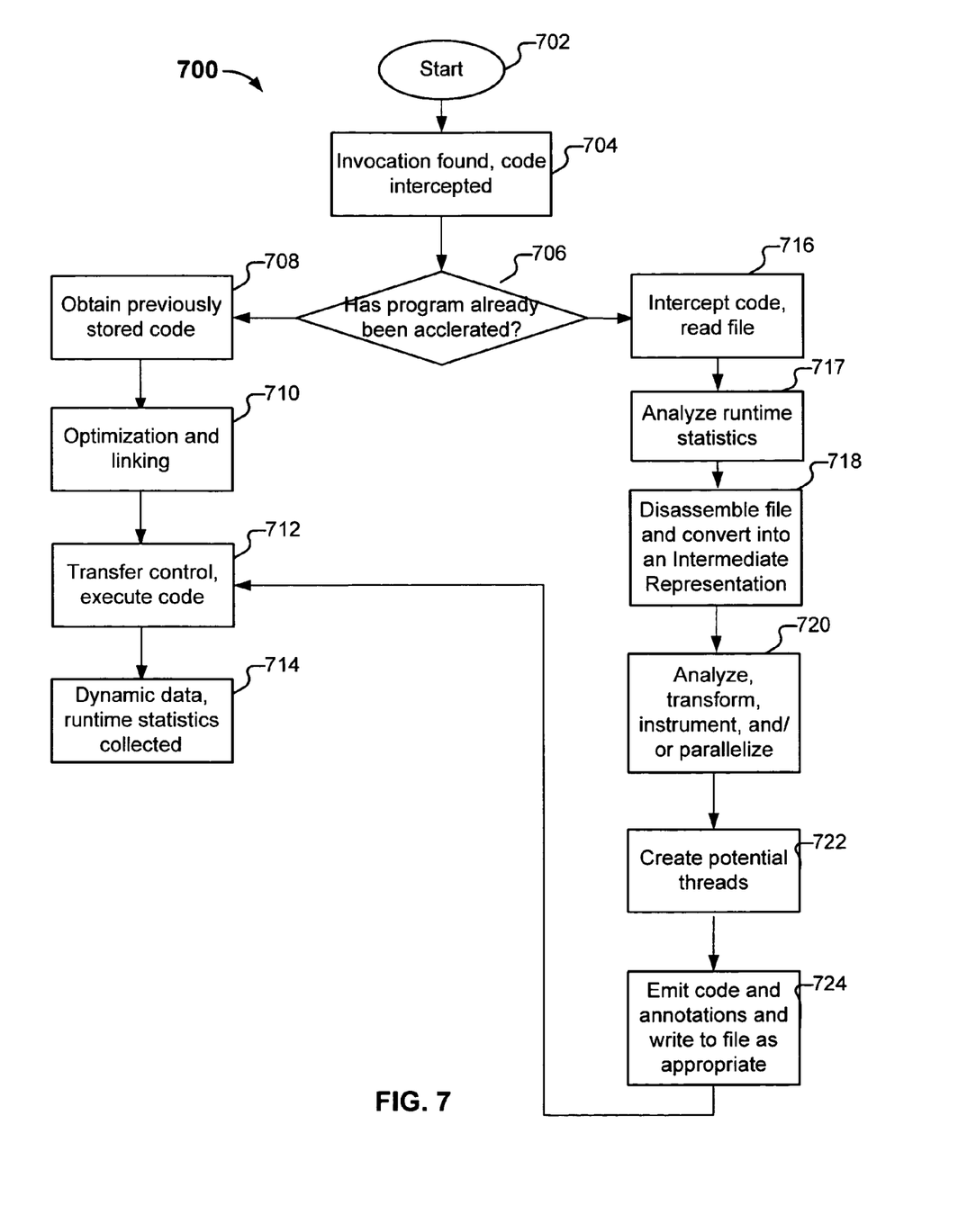
FIG. 7 is a flowchart illustrating an embodiment of a dynamic analysis process.

FIG. 7 is a flowchart illustrating an embodiment of a dynamic analysis process. Process 700 starts at 702, at boot time, in response to a user request, in response to a programmatic invocation, or the like. The process observes for program invocations. At 704, an invocation is found and the code is intercepted. At 706, it is determined whether the program has already been accelerated. The program is deemed to have been accelerated if there is a partially or fully parallelized version stored. The parallelized and/or augmented version may come from the static analysis process described above, or from a previous dynamic analysis process.

If the program has already been accelerated, at 708, the previously stored code is obtained. At 710, optimization and linking are performed as appropriate. At 712, control is transferred and the code is executed. During execution, at 714, dynamic data such as runtime statistics is collected as appropriate. Instrumenting code such as counters added to the code would provide such runtime statistics. The data is stored.

If, however, no parallelized and/or augmented version is found and the program is not pre-parallelized, at 716, the process intercepts the code and begins minimally-intrusive monitoring such as instrumenting to identify hot spots. At 717, dynamic data such as runtime statistics from previous or current execution is analyzed and incorporated. At 718, the program code is disassembled and converted into an Intermediate Representation. At 720, the IR is analyzed and transformed, where instrumenting code is inserted as needed, and the code may be parallelized. At 722, potential threads are created. At 724, executable code and annotations are emitted, and written and stored to non-volatile storage as appropriate. A mapping is established between the unmodified/minimally instrumented code and modified/parallelized code. Then, at 712, control is transferred to the modified/parallelized code, and dynamic data such as runtime statistics is collected.

Process 700 may be repeated if needed. For example, the runtime system may indicate that the process should be repeated and code should be re-generated because the hot spots have changed over time, or, as will be described in greater detail below, speculation choices were incorrect.

Figure 8:
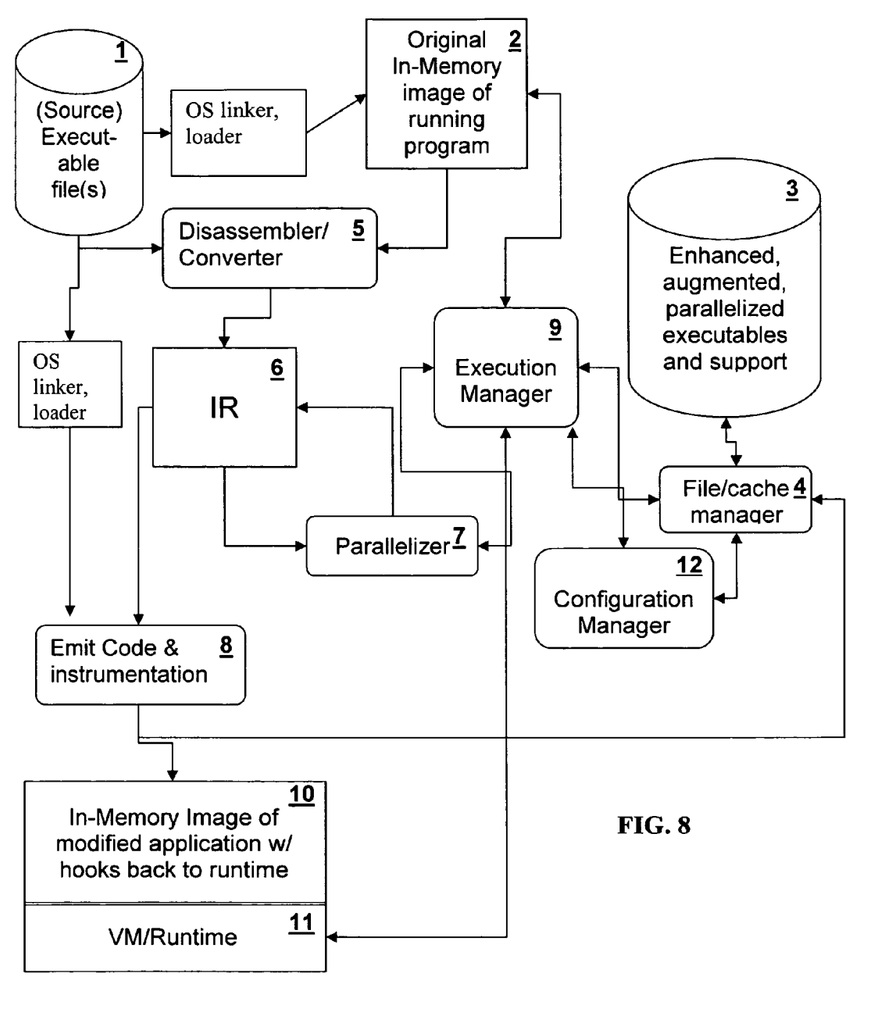
FIG. 8 is a block diagram illustrating an embodiment of a performance enhanced system that carries out the processes described in FIGS. 4 and 5.

FIG. 8 is a block diagram illustrating an embodiment of a performance enhanced system that carries out the processes described in FIGS. 4 and 5. In the example shown, the input code includes one or more source executable files 1, which are typically created by a compilation process of an application program written in a high level language. In some embodiments, the source executable files include binary code, such as code generated by the compiler, dynamically linked libraries (DLLs), shared object files (SOs), or a combination. In the example shown, the source executable files are installed on the same system as the performance enhancer. The application may include direct, explicit threading, indirect threading based on threaded libraries, or a combination.

Assume that the system shown organizes memory into multiple segments such as an executable section, initialized and un-initialized statically allocated data, a stack and dynamically allocated data. A memory space is initially allocated when a program is invoked, either as a direct consequence of user action (such as a mouse click) or for other reason (for example, triggered by another program or in response to a network event). The operating system will load the executable into memory using a loader, and relocate and link with other executables as necessary. Control is then transferred to the newly invoked program.

In the example shown, the performance enhancer includes the following functional components: Disassembler/Converter 5, Parallelizer 7, Code Emitter 8, Execution Manager 9, Configuration Manager 12, and File Cache Manager 4. The operations of some components may be partly or fully included in other components. Some of the components are optional.

Upon receiving a pointer to a section of code (i.e., a memory location for the first bit of an opcode), Disassembler/Converter 5 disassembles the instruction. This process identifies the instruction and the operands in the input code, and converts this information, along with other global information (such as processor modes), to an Intermediate Representation (IR) 6.

The Intermediate Representation represents the data structures and program information of the input code. The IR can be analyzed and manipulated by the compiler, which performs optimizations and transformations based on the IR. Some compilers employ multiple IRs such that the data format changes over time to facilitate different compilation phases. An IR typically includes information on the operations to be performed, (source) data that the operations depend upon, and the destination data.

Figure 9:
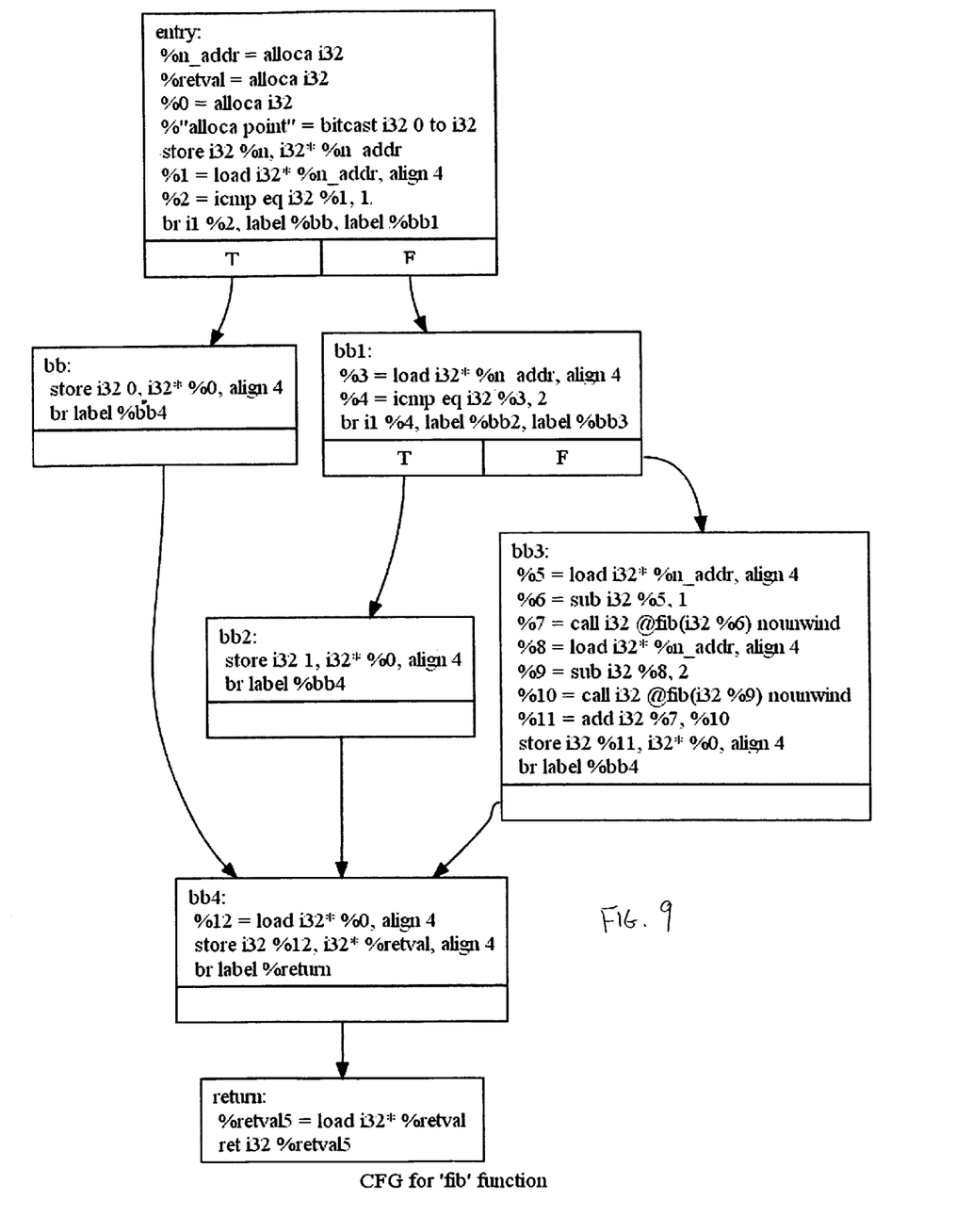
FIG. 9 is a diagram illustrating an example of an intermediate representation.

FIG. 9 is a diagram illustrating an example of an intermediate representation. In this example, a Low Level Virtual Machine (LLVM) IR of a function for computing a Fibonacci sequence is shown. The source code for the function is as follows:

```
int fib(int n) {
        if (n==1)     return 0;
        if (n==2)      return 1;
        return (fib(n-1)+fib(n-2));
}
```

Returning to FIG. 8, the IR resulting from disassembly is processed by Parallelizer 7, which generates a new IR. In this example, the Parallelizer is similar to a modern, optimizing compiler that includes multiple optimization "passes" that ultimately result in the generation of executable code. After source input has been converted into an intermediate representation, these passes will transform the intermediate representation. Each pass improves the IR directly or indirectly, preparing the IR for subsequent optimization phases. Example optimizations include dead-code elimination, constant propagation, loop-invariant analysis, and loop unrolling. In some embodiments, some passes may simply analyze the IR and create additional optimization structures for subsequent passes. In addition to the multiple optimization and transformation algorithms themselves, there is programmatically encoded judgment (also referred to as heuristics) that directs when or under what circumstances to apply these optimizations. For example, it may not be desirable to unroll a loop if doing so would increase the code size and overflow storage requirements, thus offsetting the benefits of unrolling. Additionally, there is also a higher level of control that sequences the various passes. In some embodiments of the Parallelizer, multiple passes are employed to identify and extract thread-level parallelism. These optimizations enable creation of independent threads of execution which are capable of running on separate CPUs that share common memory.

The Parallelizer can operate statically or dynamically. In some embodiments, the Parallelizer mixes both static/off-line analysis and dynamic/run-time analysis to improve performance.

When the Parallelizer is operating dynamically to perform optimizations that are more complex than simple run-time checks, where and how to perform these operations can be varied so as to minimize the performance impact of the additional processing. In some embodiments the operations and analyses are performed in a separate process or thread from the application being run. In some embodiments, the operations are performed in the same process or thread as the application.

In some embodiments, the Parallelizer may invoke optimizations involving guesses of performance-enhancing thread-level parallelism. In such cases the Parallelizer is said to "speculate" on parallelism. Code is inserted to validate that the speculation was correct. For example, the Parallelizer speculates that a long running procedure call will return a result of "0". Speculation enables the code that previously needed to wait for this result to run in parallel. Before allowing this code to commit results, however, it is necessary to verify that the aforementioned procedure really did return a result of "0." In another example, if multiple iterations of a loop are executed in different threads, it may be necessary to ensure that only the results from the programmer-specified number of iterations are committed. Thus, the effects of erroneous iterations may need to be undone or buffered. In these styles of speculative parallelization, the generated code can be structured to depend upon and work closely with runtime support described in connection with runtime environment 11.

There may be any or all of control speculation, data speculation, and memory ordering speculation. In some embodiments, the Parallelizer views the speculation and memory model as being transactional.

In some embodiments, speculation is performed in a system that allows re-compilation either in real-time or offline but still on the target system. In speculative and/or transactional systems, it is necessary to detect conflict and to support data versioning. Various embodiments utilize methods that are classified as either "eager" or "lazy." For example, an eager data versioning method would employ an undo-log to revert incorrectly computed values to their previous state, whereas a lazy method would employ a write buffer to which different versions of the data are written. Each method has advantages and disadvantages. In a static compiler, particularly one without profile-guided feedback, the compiler can guess which scheme will be the best and select that option. In practice, the best technique often depends on runtime information (such as actual delays) that is not available at compile time. In other words, the best choice may be one that is made at runtime. Moreover, since programs may go through different phases of execution with very different characteristics across phases, there may not be a single best choice. A dynamic Parallelizer can make an initial guess at the best combination of techniques to employ, observe the program's behavior over time, and improve its choice and generate new code that employs an alternate technique yielding better results as the program changes.

Returning to FIG. 8, code emitter 8 processes the parallelized IR to create binary encoded, run-able instructions. Registers are typically allocated in this phase and specific instructions are selected. In some embodiments, in addition to the instructions that directly correspond to the original source program, additional instructions may be included to perform instrumentation. The instrumentation can identify program characteristics such as hotspots where the code is repeatedly invoked, run-time information such as branch target or memory alias information. In some embodiments, the code emitter operations are performed in a separate process or thread from the application being run. In some embodiments, the Code Emitter operations are included in Parallelizer 7 or in Execution Manager 9.

The modified (i.e., instrumented and/or parallelized) application may include multiple threads of control/instructions, statically and/or dynamically allocated data, and hooks or links into libraries to provide additional runtime support. In an environment with dynamically disassembled and dynamically generated code, in-memory image 10 where the end of each block of code may contain a branch back to the controlling/managing process. In a cooperative, multi-threading environment such as this, each thread is considered "lightweight" and it is desirable to organize computation as a work queue of such threads. The work queue is managed by runtime system 11.

In an environment where applications are parallelized on the system in which they are installed and run (as opposed to parallelized at software development time), a modified operating environment for the application is created in order to preserve the appearance and correctness of single threaded operation. For example, a modified application may have multiple threads that run simultaneously on multiple CPUs and that need to share memory. The multiple threads need to have corresponding copies of resources, such as multiple "program counters" and multiple stacks. These resources are organized and managed as a virtual machine and runtime environment 11. Runtime resources may include thread managers, memory managers, exception handlers, and new/replacement copies of common program libraries and OS facilities. All of these are used to facilitate speculative/transactional operations. In some embodiments, runtime functionality may be part of the in-memory image of the modified application.

When computationally expensive optimizations and transformations are done and code is emitted, in some embodiments the output of this work is saved for future occasions when the source program is invoked. For example, after analysis, a new version of the program is created with the addition of instrumentation code to collect profiling information. The next time the program is run, the added instrumentation code can be used to gather information such as locations of "hot spots" where the program spends much of its execution time. Another example is the insertion of runtime memory alias analysis. Another example is the parallelized version of the application or multiple parallelized versions with additional, minimal runtime checks. The new augmented executable is written to one or more files. In some embodiments, to limit the amount of space used to store these files, a File Cache Manager 4 is optionally employed.

In some embodiments, File Cache Manager manages a cache that keeps the most frequently used files. In other embodiments, different management policies may be employed. For example, a most recently used policy or some combination of most frequently used may be employed. A mapping is maintained between the source executable(s) and these files. Whenever programs are invoked and parallelization is deemed to be desirable, this cache is examined to determine if a parallelized (or instrumented version) of the application exists. If so, this information is conveyed to Execution Manager 9 so that the corresponding file is loaded into memory and run in place of the originally invoked executable.

In some embodiments, an optional Execution Manager 9 is included to coordinate across the multiple modules and the multiple "Static" and "Dynamic" steps described above. Linking these functions together under a common manager on the target system allows the dynamic and static work to be intermixed and invoked as needed. For example, the Execution Manager may notice that an application has been changed because an update has been downloaded and installed. The Execution Manager would therefore initiate the static analysis. In some embodiments, Execution Manager operations may be included in Cache Manager 4, in Parallelizer 7, or in Code Emitter 8.

Figure 10:
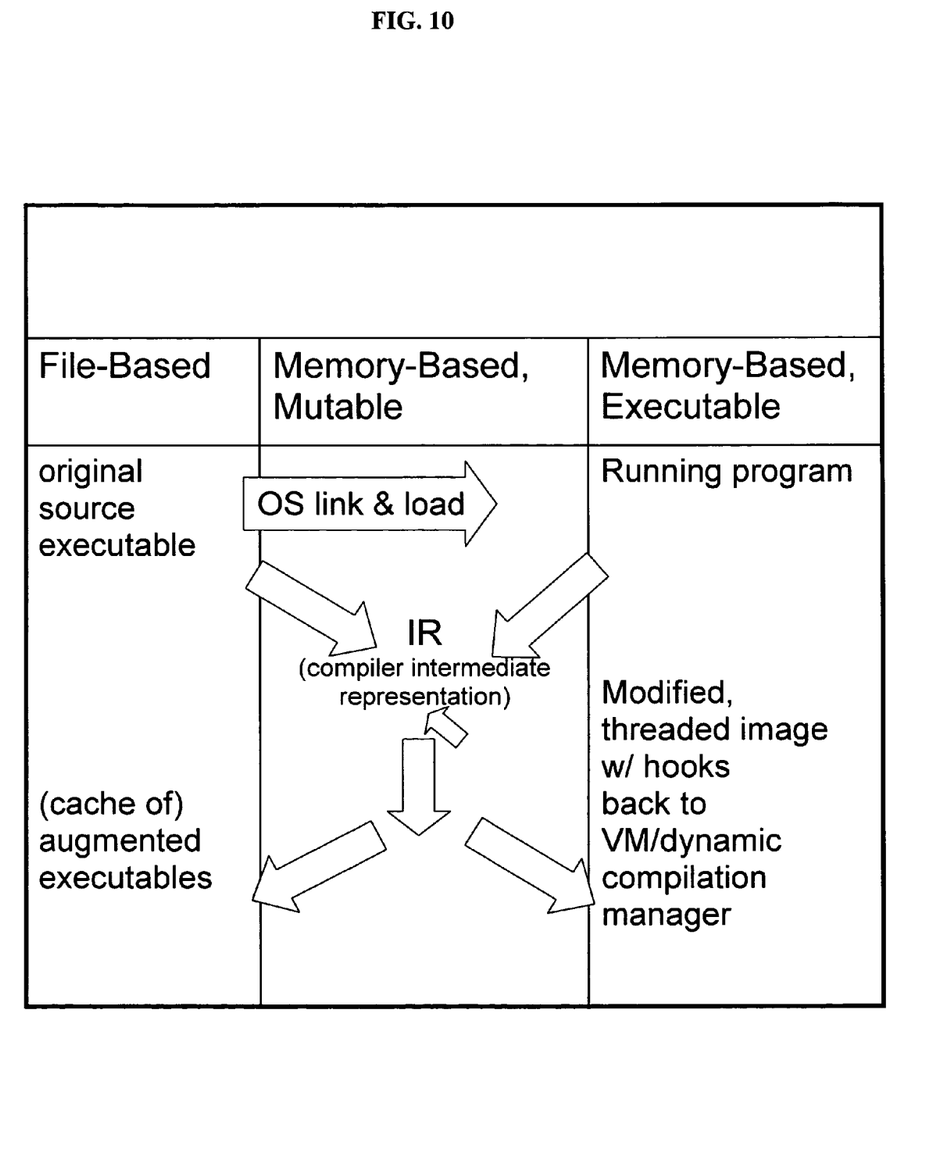
FIG. 10 is a diagram illustrating several examples of program representations and their relationship to each other.

FIG. 10 is a diagram illustrating several examples of program representations and their relationship to each other. For example, a program can exist in source form (encoded in a high-level language or assembly), object form (compiled but not yet executable) as a binary executable. System modules can link multiple object files together creating a larger, more complete executable. Other system modules can load that program into memory when it is invoked. A running, memory resident application may be running directly, or within an interpreter. The program can also exist within the compiler in its intermediate representation and a compiler's code generator can transform that same program into an executable form that may be written to a file, loaded into memory and run directly or handed to an interpreter or runtime for execution.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for generating parallelized executable code from input code, comprising:
   a plurality of processors configured to:
      statically analyze the input code to determine aspects of data flow and control flow of the input code, the input code comprising binary code of an application program designed for single core processing, wherein statically analyze the input code further includes a processor inserting instrumenting code within the input code, the instrumenting code facilitating instrumentation of runtime information;
      dynamically analyze the input code to determine additional aspects of data flow and control flow of the input code, wherein dynamically analyze the input code includes executing the instrumenting code;
      generate an intermediate representation of the input code based at least in part on the aspects of data flow and control flow of the input code identified by the static analysis and the additional aspects of data and control flow of the input code identified by the dynamic analysis;
      process the intermediate representation to determine portions of the intermediate representation that may be eligible for parallel execution; and
      generate parallelized executable code based on the intermediate representation and the input code and that is capable of being executed by the plurality of processors; and
   one or more memories coupled to the plurality of processors, configured to provide the plurality of processors with instructions.

2. The system of claim 1, wherein the static analysis includes disassembling the input code and transforming the input code into a statically generated intermediate representation.

3. The system of claim 1, wherein the static analysis includes identifying portions in the static intermediate representation that may be eligible for parallel execution.

4. The system of claim 1, wherein the dynamic analysis includes determining profile information.

5. The system of claim 1, wherein the dynamic analysis includes determining hotspot information.

6. The system of claim 1, wherein the dynamic analysis includes determining branch target information.

7. The system of claim 1, wherein the dynamic analysis includes determining memory alias information.

8. The system of claim 1, wherein the dynamic analysis includes determining dynamic loop count information.

9. The system of claim 1, further comprising modifying the intermediate representation to include parallelized portions; and generating accelerated code based on modified intermediate representation.

10. A method of generating parallelized executable code from input code, comprising:
   statically analyzing the input code to determine aspects of data flow and control flow of the input code, the input code comprising binary code of an application program designed for single core processing, wherein statically analyzing the input code further includes inserting instrumenting code within the input code, the instrumenting code facilitating instrumentation of runtime information;
   dynamically analyzing the input code to determine additional aspects of data flow and control flow of the input code, wherein dynamically analyzing the input code includes executing the instrumenting code;
   generating an intermediate representation of the input code based at least in part on the aspects of data flow and control flow of the input code identified by the static analysis and the additional aspects of data and control flow of the input code identified by the dynamic analysis;
   processing the intermediate representation to determine portions of the intermediate representation that are eligible for parallel execution; and
   generating parallelized executable code based on the intermediate representation and the input code and that is capable of being executed by a plurality of processors.

11. A computer program product for generating parallelized executable code from input code, the computer program product being embodied in a non-transitory computer readable storage medium and comprising computer instructions for:
   statically analyzing the input code to determine aspects of data flow and control flow of the input code, the input code comprising binary code of an application program designed for single core processing, wherein statically analyzing the input code further includes inserting instrumenting code within the input code, the instrumenting code facilitating instrumentation of runtime information;
   dynamically analyzing the input code to determine additional aspects of data flow and control flow of the input code, wherein dynamically analyzing the input code includes executing the instrumenting code;
   generating an intermediate representation of the input code based at least in part on the aspects of data flow and control flow of the input code identified by the static analysis and the additional aspects of data and control flow of the input code identified by the dynamic analysis;

processing the intermediate representation to determine portions of the intermediate representation that are eligible for parallel execution; and generating parallelized executable code based on the intermediate representation and the input code and that is capable of being executed by a plurality of processors.

12. A system for generating parallelized executable code from input code, comprising:

a plurality of processors configured to:
statically analyze the input code to determine aspects of data flow and control flow of the input code, the input code comprising binary code of an application program designed for single core processing, wherein statically analyze the input code further includes inserting instrumenting code within the input code, the instrumenting code facilitating instrumentation of runtime information;

dynamically analyze the input code to determine additional aspects of data flow and control flow of the input code, wherein dynamically analyze the input code includes executing the instrumenting code;

generate an intermediate representation of the input code based at least in part on the aspects and additional aspects of data flow and control flow;

process the intermediate representation to generate parallelized executable code based on the intermediate representation and the input code, the parallelized executable code being capable of being executed by the plurality of processors;

store the parallelized executable code;

in response to a request to execute the input code, execute the stored parallelized executable code with the plurality of processors; and one or more memories coupled to the plurality of processors, configured to provide the plurality of processors with instructions.

13. A method of generating parallelized executable code from input code, comprising:

statically analyzing the input code to determine aspects of data flow and control flow of the input code, the input code comprising binary code of an application program designed for single core processing, wherein statically analyzing the input code further includes inserting instrumenting code within the input code, the instrumenting code facilitating instrumentation of runtime information;

dynamically analyzing the input code to determine additional aspects of data flow and control flow of the input code, wherein dynamically analyzing the input code includes executing the instrumenting code;

generating an intermediate representation of the input code based at least in part on the aspects and additional aspects of data flow and control flow;

processing the intermediate representation to generate parallelized executable code based on the intermediate representation and the input code, the parallelized executable code being capable of being executed by a plurality of processors;

storing the parallelized executable code; and in response to a request to execute the input code, executing the stored parallelized executable code with the plurality of processors.

14. A computer program product for generating parallelized executable code from input code, the computer program product being embodied in a non-transitory computer readable storage medium and comprising computer instructions for:

statically analyzing the input code to determine aspects of data flow and control flow of the input code, the input code comprising binary code of an application program designed for single core processing, wherein statically analyzing the input code further includes inserting instrumenting code within the input code, the instrumenting code facilitating instrumentation of runtime information;

dynamically analyzing the input code to determine additional aspects of data flow and control flow of the input code, wherein dynamically analyzing the input code includes executing the instrumenting code;

generating an intermediate representation of the input code based at least in part on the aspects and additional aspects of data flow and control flow;

processing the intermediate representation to generate parallelized executable code based on the intermediate representation and the input code and that is capable of being executed by a plurality of processors;

storing the parallelized executable code; and in response to a request to execute the input code, executing the stored parallelized executable code with the plurality of processors.

15. The computer program product of claim 14, wherein statically analyzing the input code includes disassembling the input code and transforming the input code into a statically generated intermediate representation.

16. The method of claim 10, wherein statically analyzing the input code includes disassembling the input code and transforming the input code into a statically generated intermediate representation.

17. The computer program product of claim 11, wherein statically analyzing the input code includes disassembling the input code and transforming the input code into a statically generated intermediate representation.

18. The system of claim 12, wherein the plurality of processors statically analyzing the input code includes disassembling the input code and transforming the input code into a statically generated intermediate representation.

19. The method of claim 13, wherein statically analyzing the input code includes disassembling the input code and transforming the input code into a statically generated intermediate representation.

20. A system for generating parallelized executable code from input code, comprising:

means for statically analyzing the input code to determine aspects of data flow and control flow of the input code, the input code comprising binary code of an application program designed for single core processing, wherein the means for statically analyzing the input code further includes means for inserting instrumenting code within the input code, the instrumenting code facilitating instrumentation of runtime information;

means for dynamically analyzing the input code to determine additional aspects of data flow and control flow of the input code, wherein the means for dynamically analyzing the input code includes means for executing the instrumenting code;

means for generating an intermediate representation of the input code based at least in part on the aspects of data flow and control flow of the input code identified by the static analysis and the additional aspects of data and control flow of the input code identified by the dynamic analysis;

means for processing the intermediate representation to determine portions of the intermediate representation that may be eligible for parallel execution; and means for generating parallelized executable code based on the intermediate representation and the input code and that is capable of being executed by a plurality of processors.

21. The system of claim 20, wherein the means for statically analyzing the input code includes means for disassembling the input code and means for transforming the input code into a statically generated intermediate representation.

22. The system of claim 20, wherein the means for statically analyzing the input code includes means for identifying portions in the static intermediate representation that may be eligible for parallel execution.

23. The system of claim 20, wherein the means for statically analyzing the input code includes means determining profile information.

* * * * *